US012579687B2

(12) United States Patent
Ikeda et al.

(10) Patent No.: US 12,579,687 B2
(45) Date of Patent: Mar. 17, 2026

(54) ESTIMATION DEVICE, ESTIMATION METHOD, AND NON-TRANSITORY STORAGE MEDIUM THAT CALCULATES AN ESTIMATE VALUE OF A MOBILE OBJECT'S POSITION DERIVED FROM THREE-DIMENSIONAL POINT CLOUD DATA MATCHINGS

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/667,095

(22) Filed: May 17, 2024

(65) Prior Publication Data

US 2024/0404105 A1 Dec. 5, 2024

(30) Foreign Application Priority Data

May 31, 2023 (JP) ................................. 2023-089451
Nov. 2, 2023 (JP) ................................. 2023-188218

(51) Int. Cl.
*G05D 1/24* (2024.01)
*G06T 7/73* (2017.01)
*B62D 65/18* (2006.01)

(52) U.S. Cl.
CPC ................. *G06T 7/74* (2017.01); *G05D 1/24* (2024.01); *B62D 65/18* (2013.01); *G06T 2207/10028* (2013.01)

(58) Field of Classification Search
CPC ........ G05D 1/0011; G05D 1/02; G05D 1/221; G05D 1/225; G05D 1/24; G05D 1/247;
(Continued)

(56) References Cited

U.S. PATENT DOCUMENTS

| | | | | |
|---|---|---|---|---|
| 12,045,056 B2 * | 7/2024 | Suzuki | ................ | G05D 1/0274 |
| 2012/0033071 A1 * | 2/2012 | Kobayashi | ........... | G01B 11/002 |
| | | | | 348/139 |

(Continued)

FOREIGN PATENT DOCUMENTS

| | | |
|---|---|---|
| JP | 2016-057677 A | 4/2016 |
| JP | 2017-538619 A | 12/2017 |

(Continued)

*Primary Examiner* — Dino Kujundzic
(74) *Attorney, Agent, or Firm* — Sughrue Mion, PLLC

(57) ABSTRACT

An estimation device used to cause a mobile object to move by driverless driving includes one or more processors configured to: perform first matching using three-dimensional point cloud data on the mobile object acquired by a first distance measurement device, and calculate at least one of a position and an orientation of the mobile object as a first calculation result derived from the first matching; perform second matching using three-dimensional point cloud data on the mobile object acquired by a second distance measurement device, and calculate at least one of a position and an orientation of the mobile object as a second calculation result derived from the second matching; and execute an estimation process of calculating an estimate value by using at least one of the first calculation result and the second calculation result, depending on the first calculation result and the second calculation result.

5 Claims, 8 Drawing Sheets

(58) Field of Classification Search
CPC . G05D 1/249; G05D 1/43; G06T 2207/10028
See application file for complete search history.

(56) References Cited

U.S. PATENT DOCUMENTS

| 2017/0252925 | A1* | 9/2017 | Cho | .................. B25J 9/1666 |
| 2017/0320529 | A1 | 11/2017 | Nordbruch | |
| 2021/0394747 | A1 | 12/2021 | Li et al. | |
| 2024/0249427 | A1* | 7/2024 | Sasatani | .................. G08G 1/00 |
| 2024/0400063 | A1 | 12/2024 | Ikeda et al. | |

FOREIGN PATENT DOCUMENTS

| JP | 2022-515809 | A | 2/2022 |
| JP | 2022-175768 | A | 11/2022 |
| JP | 2023-20478 | A | 2/2023 |

* cited by examiner

FIG. 3A

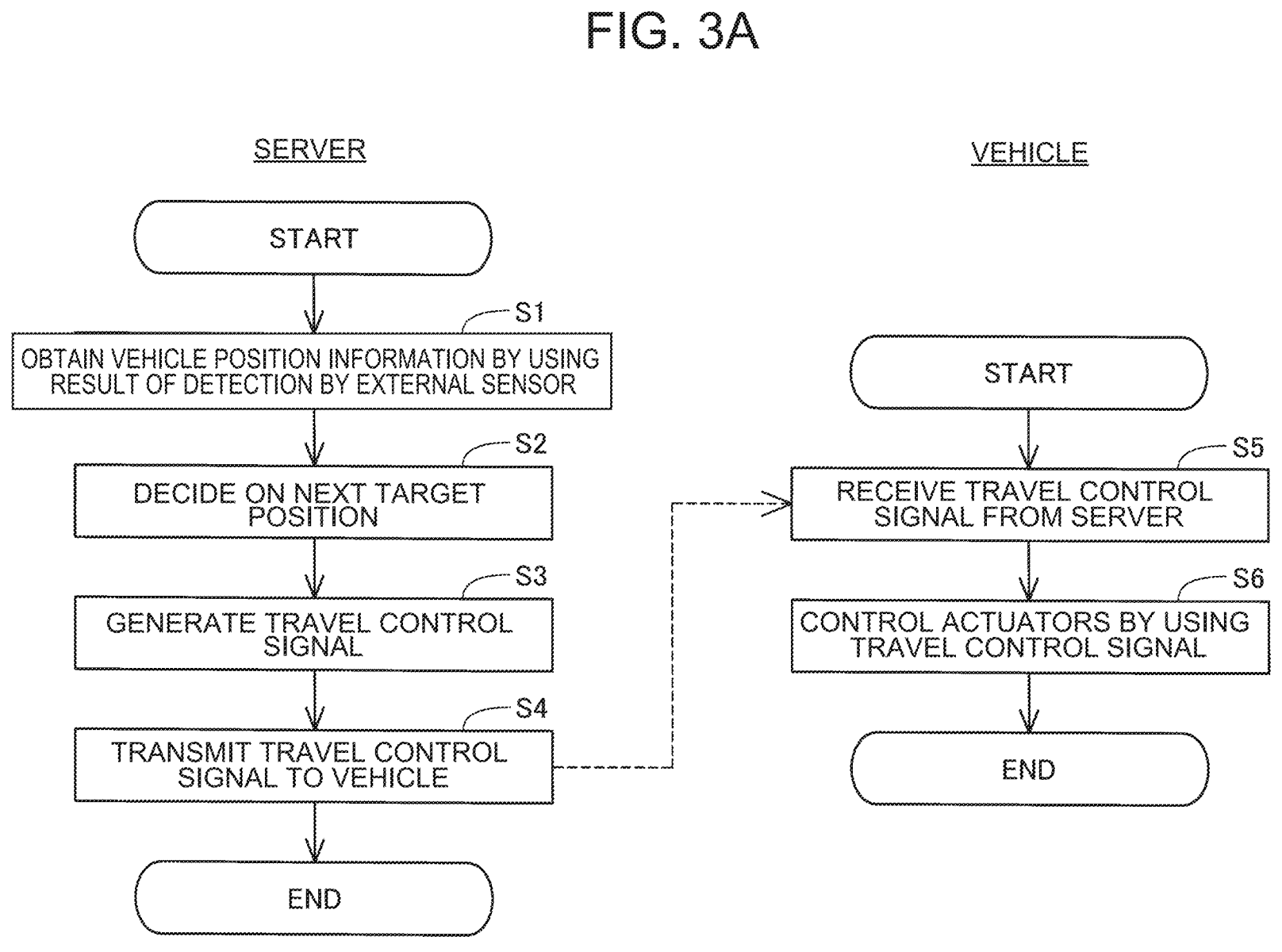

VEHICLE

START

S5 RECEIVE TRAVEL CONTROL SIGNAL FROM SERVER

S6 CONTROL ACTUATORS BY USING TRAVEL CONTROL SIGNAL

END

SERVER

START

S1 OBTAIN VEHICLE POSITION INFORMATION BY USING RESULT OF DETECTION BY EXTERNAL SENSOR

S2 DECIDE ON NEXT TARGET POSITION

S3 GENERATE TRAVEL CONTROL SIGNAL

S4 TRANSMIT TRAVEL CONTROL SIGNAL TO VEHICLE

END

VEHICLE

START

OBTAIN VEHICLE POSITION INFORMATION BY USING
RESULT OF DETECTION BY EXTERNAL SENSOR — S11

DECIDE ON NEXT TARGET POSITION — S21

GENERATE TRAVEL CONTROL SIGNAL — S31

CONTROL ACTUATORS BY USING
TRAVEL CONTROL SIGNAL — S41

END

ESTIMATION DEVICE, ESTIMATION METHOD, AND NON-TRANSITORY STORAGE MEDIUM THAT CALCULATES AN ESTIMATE VALUE OF A MOBILE OBJECT'S POSITION DERIVED FROM THREE-DIMENSIONAL POINT CLOUD DATA MATCHINGS

CROSS-REFERENCE TO RELATED APPLICATION

This application claims priority to Japanese Patent Application No. 2023-089451 filed on May 31, 2023 and Japanese Patent Application No. 2023-188218 filed on Nov. 2, 2023, each incorporated herein by reference in its entirety.

BACKGROUND

1. Technical Field

The present disclosure relates to an estimation device, an estimation method, and a non-transitory storage medium.

2. Description of Related Art

Japanese Unexamined Patent Application Publication (Translation of PCT application) No. 2017-538619 discloses a technology in which in a process of manufacturing a vehicle, the vehicle is caused to travel autonomously or by remote control.

SUMMARY

To control movement of a mobile object such as a vehicle, there has been known a technology in which the position and the orientation of a mobile object are estimated, by using three-dimensional point cloud data on the mobile object acquired by using a distance measurement device. There is a desire for a technology for enhancing accuracy in such estimation of the position and the orientation of a mobile object.

The present disclosure can be implemented in embodiments as follows.

An estimation device used to cause a mobile object to move by driverless driving, according to a first aspect of the present disclosure, includes one or more processors configured to: perform first matching using three-dimensional point cloud data on the mobile object acquired by a first distance measurement device, and calculate at least one of a position and an orientation of the mobile object as a first calculation result derived from the first matching; perform second matching using three-dimensional point cloud data on the mobile object acquired by a second distance measurement device, and calculate at least one of a position and an orientation of the mobile object as a second calculation result derived from the second matching; calculate an estimate value that is an estimate value of at least one of the position and the orientation of the mobile object and that is used to generate a control command for the driverless driving; and execute an estimation process of calculating the estimate value by using at least one of the first calculation result and the second calculation result, depending on the first calculation result and the second calculation result.

According to such an embodiment, the first calculation result, which is derived from matching using three-dimensional point cloud data acquired by the first distance measurement device, and the second calculation result, which is derived from matching using three-dimensional point cloud data acquired by the second distance measurement device, are individually calculated, and an estimate value of position or orientation can be calculated depending on each calculation result. Accordingly, the possibility increases that accuracy in the position or orientation estimation can be enhanced, in comparison with, for example, a case where only a single calculation result is calculated when the position or the orientation is estimated.

In the estimation device according to the aspect, the one or more processors may be configured to execute the estimation process using at least one of the first calculation result and the second calculation result when a difference between the first calculation result and the second calculation result is less than a predetermined standard level, and not to execute the estimation process when the difference is the standard level or more. According to such an embodiment, when the difference between the first calculation result and the second calculation result is relatively small, the estimation process using the first calculation result or the second calculation result can be executed. When the difference between the first calculation result and the second calculation result is relatively large, the estimation process is not executed. Accordingly, it is possible to restrain accuracy in the position or orientation estimation from decreasing due to the difference between the calculation results.

In the estimation device according to the aspect, in the estimation process, the one or more processors may be configured to calculate the estimate value by using one calculation result derived from the matching with higher reliability, of the first calculation result and the second calculation result. According to such an embodiment, since the position or the orientation can be estimated by using the calculation result derived from the matching with higher reliability, the possibility further increases that accuracy in the estimation can be enhanced.

In the estimation device according to the aspect, in the estimation process, the one or more processors may be configured to calculate the estimate value by using an average of the first calculation result and the second calculation result. According to such an embodiment, the position or the orientation can be easily estimated by using the first calculation result and the second calculation result.

In the estimation device according to the aspect, when the difference is the standard level or more, the one or more processors may be configured to generate a deceleration command to cause the mobile object to decelerate or stop. According to such an embodiment, when accuracy in the position or orientation estimation can decrease due to the difference between the calculation results, it is possible to cause the mobile object under remote control to decelerate or stop.

An estimation method according to a second aspect of the present disclosure includes: performing first matching using three-dimensional point cloud data on a mobile object acquired by a first distance measurement device, and calculating at least one of a position and an orientation of the mobile object as a first calculation result derived from the first matching; performing second matching using three-dimensional point cloud data on the mobile object acquired by a second distance measurement device, and calculating at least one of a position and an orientation of the mobile object as a second calculation result derived from the second matching; calculating an estimate value that is an estimate value of at least one of the position and the orientation of the mobile object and that is used to generate a control command for driverless driving; and executing an estimation process of calculating the estimate value by using at least one of the first calculation result and the second calculation result, depending on the first calculation result and the second calculation result.

A non-transitory storage medium according to a third aspect of the present disclosure stores instructions that are executable by one or more processors and that cause the one or more processors to perform functions including: performing first matching using three-dimensional point cloud data on a mobile object acquired by a first distance measurement device, and calculating at least one of a position and an orientation of the mobile object as a first calculation result derived from the first matching; performing second matching using three-dimensional point cloud data on the mobile object acquired by a second distance measurement device, and calculating at least one of a position and an orientation of the mobile object as a second calculation result derived from the second matching; calculating an estimate value that is an estimate value of at least one of the position and the orientation of the mobile object and that is used to generate a control command for driverless driving; and executing an estimation process of calculating the estimate value by using at least one of the first calculation result and the second calculation result, depending on the first calculation result and the second calculation result.

The present disclosure can be implemented in embodiments other than the embodiments as the estimation device, an estimation method and a non-transitory storage medium storing the computer program, for example, as a system, a computer program, and the like.

BRIEF DESCRIPTION OF THE DRAWINGS

Features, advantages, and technical and industrial significance of exemplary embodiments will be described below with reference to the accompanying drawings, in which like signs denote like elements, and wherein:

FIG. 3A is a flowchart showing a processing procedure for vehicle travel control in a first embodiment;

DETAILED DESCRIPTION OF EMBODIMENTS

A. First Embodiment

Figure 1:
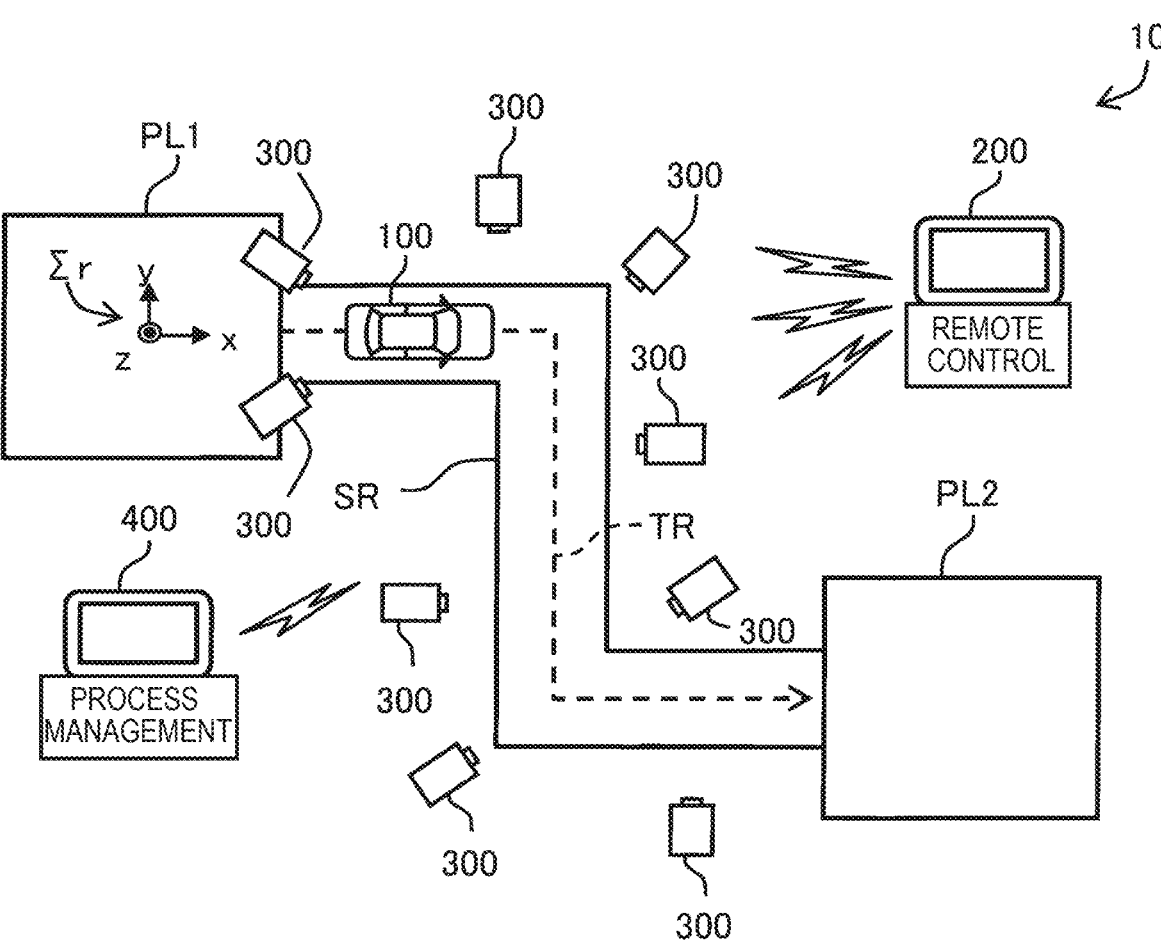
FIG. 1 is a conceptual diagram showing a configuration of a system.

FIG. 1 is a conceptual diagram showing a configuration of a system 10 in the present embodiment. The system 10 includes one or more vehicles 100 each as a mobile object, a control device 200 that performs remote control of the vehicle 100, a plurality of distance measurement devices 300 that measures three-dimensional point cloud data on the vehicle 100, and a process management device 400 that performs management of a process of manufacturing the vehicle 100. In the first embodiment, the control device 200 corresponds to "estimation device" in the present disclosure. The control device 200 is also referred to as a server.

In the present disclosure, a "mobile object" refers to an object that can move, and examples thereof include a vehicle and an electric vertical takeoff and landing aircraft (so-called flying car). The vehicle 100 may be a vehicle that travels with wheels or a vehicle that travels with endless track, and examples thereof include a passenger car, a motor truck, a bus, a two-wheel vehicle, a four-wheel vehicle, a tank, a construction vehicle, and the like. Vehicles 100 include a battery electric vehicle (BEV), a gasoline vehicle, a hybrid electric vehicle, and a fuel cell electric vehicle. When a mobile object is other than a vehicle, expressions "vehicle" and "car" in the present disclosure can be replaced with "mobile object" as appropriate, and an expression "travel" can be replaced with "move" as appropriate.

The vehicle 100 is configured to be able to travel by driverless driving. "Driverless driving" refers to driving not based on traveling maneuvers by an occupant. A traveling maneuver refers to a maneuver related to at least any one of "traveling", "turning", and "stopping" of the vehicle 100. The driverless driving is implemented by automatic or manual remote control using a device located outside of the vehicle 100, or by autonomous control by the vehicle 100. An occupant who does not perform traveling maneuvers may be on board the vehicle 100 that is traveling by driverless driving. Examples of the occupant who does not perform traveling maneuvers include a person who simply sits in a seat of the vehicle 100 and a person who does work different from traveling maneuvers, such as installation, inspection, or operation of switches and the like, while on board the vehicle 100. Note that the driving based on traveling maneuvers by an occupant is referred to as "manned driving" in some cases.

In the present description, "remote control" includes "full remote control" in which all operations of the vehicle 100 are completely decided from outside of the vehicle 100, and "partial remote control" in which one or some of the operations of the vehicle 100 are decided from outside of the vehicle 100. "Autonomous control" includes "full autonomous control" in which the vehicle 100 autonomously controls own operations without receiving any information from a device outside of the vehicle 100, and "partial autonomous control" in which the vehicle 100 autonomously controls own operations by using information received from a device outside of the vehicle 100.

It is preferable that the vehicle 100 be a battery electric vehicle (BEV).

The system 10 in the present embodiment is configured as a remote control system that causes the vehicle 100 to travel by remote control. In the present embodiment, remote control of the vehicle 100 is performed in a factory where the vehicle 100 is manufactured. The factory includes a first place PL1 and a second place PL2. The first place PL1 is, for example, a place where assembly of the vehicle 100 is conducted, and the second place PL2 is, for example, a place where inspection of the vehicle 100 is conducted. The first place PL1 and the second place PL2 are connected by a drive lane SR on which the vehicle 100 can travel. An arbitrary position in the factory is represented by xyz-coordinate values of a standard coordinate system Σr.

The plurality of distance measurement devices 300 is installed around the drive lane SR, for the vehicle 100 as a subject of measurement. The control device 200 can acquire, in real time, the relative position and the relative orientation of the vehicle 100 with respect to a target route TR, as well as a direction in which the vehicle 100 travels, by using three-dimensional point cloud data measured by each distance measurement device 300. For a distance measurement device 300, a camera or a light detection and ranging (LiDAR) can be used. The LiDAR, in particular, is preferable in the point that high-precision three-dimensional point cloud data can be obtained. Each distance measurement device 300 in the present embodiment is configured by using a LiDAR. It is preferable that the plurality of distance measurement devices 300 be deployed in such a manner that the vehicle 100 can be always measured by two or more distance measurement devices 300 when the vehicle 100 is at an arbitrary position on the target route TR. In the present embodiment, the position of each distance measurement device 300 is fixed, and a relative relationship between the standard coordinate system $\Sigma r$ and a device coordinate system of each distance measurement device 300 is known. A coordinate transformation matrix for transforming coordinate values of the standard coordinate system $\Sigma r$ into coordinate values of the device coordinate system of each distance measurement device 300, and vice versa, is stored in the control device 200 beforehand.

Hereinafter, of the plurality of distance measurement devices 300, two distance measurement devices 300 in charge of measuring the vehicle 100 under driverless driving are also referred to as a first distance measurement device and a second distance measurement device, respectively. More specifically, the first distance measurement device and the second distance measurement device are in charge of measuring the vehicle 100 at approximately the same positions on the target route TR, respectively. In other words, when the vehicle 100 is traveling on the target route TR, the first distance measurement device and the second distance measurement device individually measure the vehicle 100 at similar timings and individually acquire three-dimensional point cloud data on the vehicle 100 at the similar timings. Hereinafter, the vehicle 100 under driverless driving is also referred to as the target vehicle 100.

The control device 200 in the present embodiment is configured as a remote control device that generates, and transmits to the vehicle 100, a control command for remote control of the vehicle 100. More specifically, the control device 200 generates a control command to cause the vehicle 100 to travel along the target route TR, and transmits the control command to the vehicle 100. The vehicle 100 travels according to the received control command. Accordingly, with the system 10, the vehicle 100 can be moved from the first place PL1 to the second place PL2 by remote control, without using transport equipment such as a crane or a conveyor. Note that the target route TR in the present embodiment corresponds to a reference path, which will be described later. Details of the control command will be described later.

Figure 2:
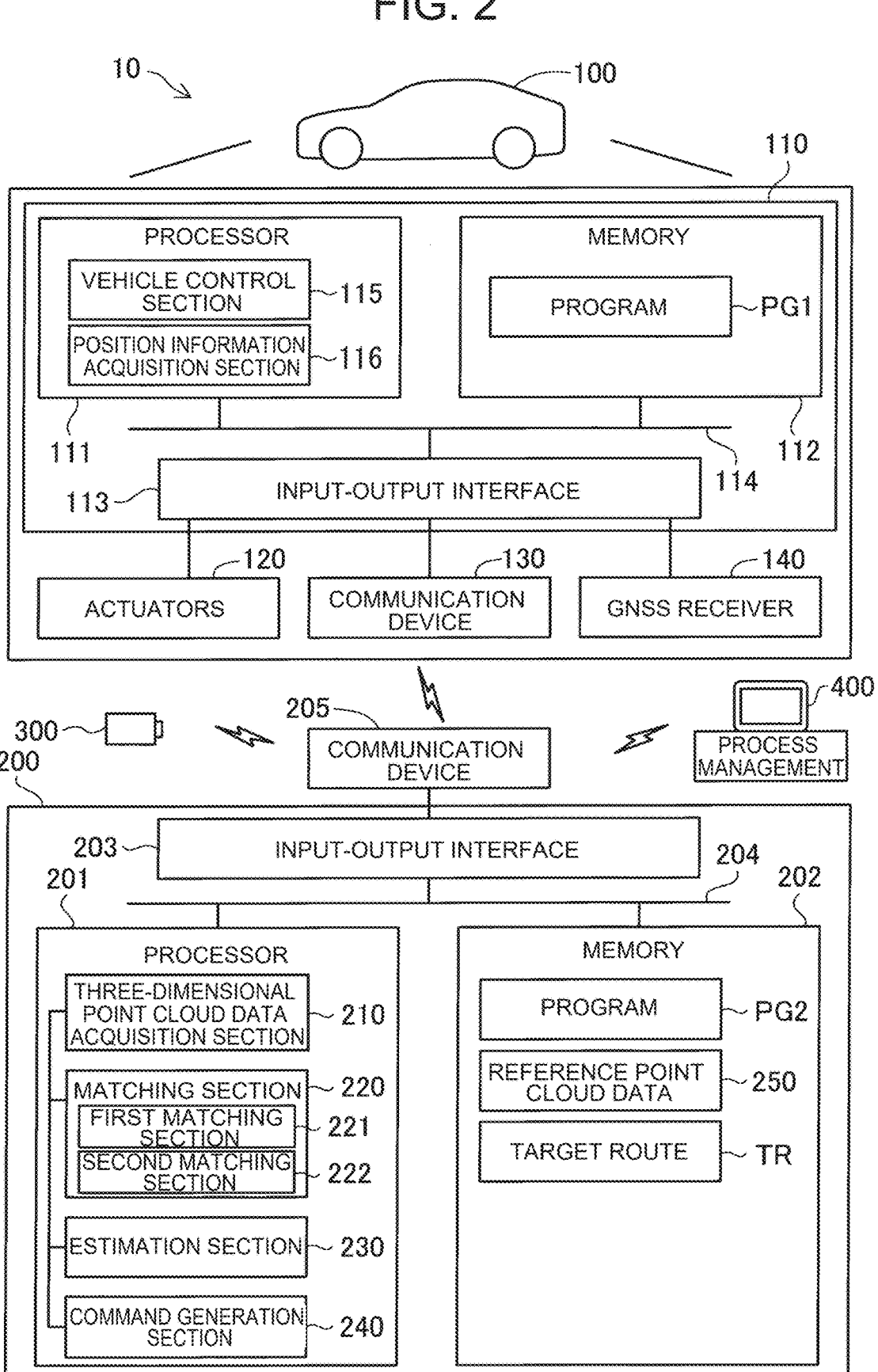
FIG. 2 is a block diagram showing configurations of a vehicle and a control device.

FIG. 2 is a block diagram showing configurations of the vehicle 100 and the control device 200. The vehicle 100 includes: a vehicle control device 110 for controlling each part of the vehicle 100; actuators 120 that drive under control of the vehicle control device 110; a communication device 130 for communicating with the control device 200 through wireless communication; and a global navigation satellite system (GNSS) receiver 140 for acquiring position information on the vehicle 100. In the present embodiment, the actuators 120 include an actuator of a drive train for accelerating the vehicle 100, an actuator of a steering system for changing the traveling direction of the vehicle 100, and an actuator of a braking device for decelerating the vehicle 100. The drive train includes a battery, a traction motor driven by electricity from the battery, and drive wheels rotated by the traction motor. The actuator of the drive train includes the traction motor. Note that the actuators 120 may further include an actuator for swinging a wiper of the vehicle 100, an actuator for opening and closing a power window of the vehicle 100, and the like.

The vehicle control device 110 is configured by using a computer including a processor 111, a memory 112, an input-output interface 113, and an internal bus 114. The processor 111, the memory 112, and the input-output interface 113 are connected through the internal bus 114 in such a manner as to be able to perform bi-directional communication. The actuators 120, the communication device 130, and the GNSS receiver 140 are connected to the input-output interface 113.

In the present embodiment, the processor 111 functions as a vehicle control section 115 and a position information acquisition section 116, by executing a program PG1 stored in the memory 112 beforehand. The vehicle control section 115 controls the actuators 120. When a driver is on board the vehicle 100, the vehicle control section 115 can cause the vehicle 100 to travel by controlling the actuators 120, according to maneuvers by the driver. The vehicle control section 115 can also cause the vehicle 100 to travel by controlling the actuators 120 according to a control command transmitted from the control device 200, regardless of whether or not a driver is on board the vehicle 100. The position information acquisition section 116 acquires position information indicating the current position of the vehicle 100, by using the GNSS receiver 140. However, the position information acquisition section 116 and the GNSS receiver 140 can be omitted.

The control device 200 is configured by using a computer including a processor 201, a memory 202, an input-output interface 203, and an internal bus 204. The processor 201, the memory 202, and the input-output interface 203 are connected through the internal bus 204 in such a manner as to be able to perform bi-directional communication. A communication device 205 for communicating with the vehicle 100, the distance measurement devices 300, and the process management device 400 through wireless communication is connected to the input-output interface 203.

In the present embodiment, the processor 201 functions, by executing a program PG2 stored in the memory 202 beforehand, as a three-dimensional point cloud data acquisition section 210, a matching section 220, an estimation section 230, and a command generation section 240. In addition to the program PG2, reference point cloud data 250, which will be described later, and the target route TR are stored in the memory 202.

The three-dimensional point cloud data acquisition section 210 acquires three-dimensional point cloud data on the vehicle 100 measured by each distance measurement device 300. The three-dimensional point cloud data is data indicating the three-dimensional positions of points detected by each distance measurement device 300. Three-dimensional point cloud data on a mobile object measured by a distance measurement device 300 is also referred to as measured point cloud data.

The matching section 220 performs template matching (hereinafter, also simply referred to as matching) using the measured point cloud data and the reference point cloud data 250. The matching section 220 includes a first matching section 221 and a second matching section 222. The first matching section 221 performs first matching and calculates at least one of the position and the orientation of the vehicle 100 as a first calculation result that is a calculation result derived from the first matching. The first matching refers to matching using first measured point cloud data that is measured point cloud data acquired by the first distance measurement device. The second matching section 222 performs second matching and calculates at least one of the position and the orientation of the vehicle 100 as a second calculation result that is a calculation result derived from the second matching. The second matching refers to matching using second measured point cloud data that is measured point cloud data acquired by the second distance measurement device. For an algorithm of the matching by the matching section 220, any of various algorithms, such as iterative closest point (ICP) and normal distributions transform (NDT), can be used.

The estimation section 230 calculates an estimate value of at least one of the position and the orientation of the vehicle 100 by using the result of the matching performed by the matching section 220. More specifically, the estimation section 230 calculates the estimate value by executing an estimation process. The estimation process refers to a process of calculating an estimate value by using at least one of the first calculation result and the second calculation result, depending on the first calculation result and the second calculation result. Thus the calculated estimate value is used to generate a control command for remote control. Specifically, in the present embodiment, the estimate value corresponds to vehicle position information, which will be described later. Hereinafter, the calculation of an estimate value of the position of the vehicle 100 is also referred to as "position estimation", and the calculation of an estimate value of the orientation of the vehicle 100 is also referred to as "orientation estimation". The estimation section 230 in the present embodiment estimates both the position and the orientation of the vehicle 100.

In the present embodiment, the position of the vehicle 100 is estimated as xyz coordinates of a predetermined detection point on the vehicle 100. The orientation of the vehicle 100 is estimated as the orientation of a vector that goes along a center axis of the vehicle 100 and goes from a rear side toward a front side of the vehicle 100. For example, the vector is identified by using the coordinates of a center position in a vehicle-width direction on the front side of the vehicle 100, and the coordinates of a center position in the vehicle-width direction on the rear side of the vehicle 100. Note that the position and the orientation of the vehicle 100 only need to be estimated in such a manner as to be usable in generation of a control command for remote control, and aspects of the position estimation and the orientation estimation are not limited to those described above.

When the three-dimensional point cloud data cannot be used, the estimation section 230 can estimate the position and the orientation of the vehicle 100, by using travel history of the vehicle 100 or position information detected by the GNSS receiver 140 mounted in the vehicle 100. The estimation section 230 may estimate only one of the position and the orientation of the vehicle 100. In such a case, the other one of the position and the orientation of the vehicle 100 is determined by using, for example, the travel history of the vehicle 100 or history of control commands transmitted to the vehicle 100. Note that the direction in which the vehicle 100 travels can be estimated by using, for example, any one, or two or more, of the orientation of the vehicle 100, the travel history, and the history of control commands.

By using the estimated position and orientation of the vehicle 100, the command generation section 240 generates a control command to cause the vehicle 100 to travel by driverless driving and transmits the control command to the vehicle 100. In the present embodiment, the control command is a command to cause the vehicle 100 to travel according to the target route TR stored in the memory 202. Specifically, the control command in the present embodiment is a travel control signal, which will be described later. Moreover, in the present embodiment, the command generation section 240 also functions as a deceleration command section that generates a deceleration command. The deceleration command refers to a control command to cause the target vehicle 100 to decelerate or stop.

Note that the control command to cause the vehicle 100 to travel by driverless driving may include at least one of the travel control signal and generation information for generating the travel control signal. Accordingly, in another embodiment, the control command may include the generation information in place of, or in addition to, the travel control signal. For the generation information, for example, vehicle position information, a path, or a target position, which will be described later, can be used.

The process management device 400 is configured by using, for example, a computer and performs management of the entire process of manufacturing vehicles 100 in the factory. For example, when one vehicle 100 starts traveling along the target route TR, individual information indicating an identification number, a model code, and the like by which the vehicle 100 is identified is transmitted from the process management device 400 to the control device 200. The position of the vehicle 100 detected by the control device 200 is also transmitted to the process management device 400. Note that functionality of the process management device 400 may be implemented in the same device as the control device 200.

FIG. 3A is a flowchart showing a processing procedure for travel control of the vehicle 100 in a first embodiment. In S1, the control device 200 obtains vehicle position information on the vehicle 100, by using a result of detection output from an external sensor that is a sensor located outside of the vehicle 100. The vehicle position information is position information that serves as a base for generating a travel control signal. In the present embodiment, the vehicle position information includes the position and the orientation of the vehicle 100 in the standard coordinate system Σr of the factory. In the present embodiment, the standard coordinate system Σr of the factory is a global coordinate system, and an arbitrary position in the factory is represented by X, Y, Z coordinates in the global coordinate system. In the present embodiment, the external sensor is a distance measurement device 300 installed in the factory, and measured point cloud data, as a result of detection, is output from each distance measurement device 300. In other words, in S1, the control device 200 obtains vehicle position information by using measured point cloud data acquired from a distance measurement device 300 that is an external sensor. Specifically, the control device 200 obtains the vehicle position information through template matching using the measured point cloud data and the reference point cloud data 250.

In S2, the control device 200 decides on a target position for the vehicle 100 to head for next. In the present embodiment, the target position is represented by X, Y, Z coordinates in the global coordinate system. A reference path, which is a path for the vehicle 100 to travel along, is stored in the memory of the control device 200 beforehand. The path is represented by a node indicating a departure point, a node indicating a waypoint, a node indicating a destination, and links connecting each node. The control device 200 decides on the target position for the vehicle 100 to head for next, by using the vehicle position information and the reference path. The control device 200 decides on the target position on the reference path ahead of the current position of the vehicle 100.

In S3, the control device 200 generates a travel control signal for causing the vehicle 100 to travel toward the decided target position. In the present embodiment, the travel control signal includes an acceleration rate and a steering wheel angle of the vehicle 100 as parameters. The control device 200 calculates the travel speed of the vehicle 100 from changes in position of the vehicle 100, and compares the calculated travel speed with a target speed. The control device 200 decides on an acceleration rate such as to cause the vehicle 100 to accelerate when the travel speed is less than the target speed as a whole, and decides on an acceleration rate such as to cause the vehicle 100 to decelerate when the travel speed is more than the target speed as a whole. Moreover, the control device 200 decides on a steering wheel angle and an acceleration rate such as to cause the vehicle 100 not to deviate from the reference path when the vehicle 100 is positioned on the reference path, and decides on a steering wheel angle and an acceleration rate such as to cause the vehicle 100 to return to the reference path when the vehicle 100 is not positioned on the reference path, in other words, when the vehicle 100 deviates from the reference path. In another embodiment, the travel control signal may include a speed of the vehicle 100 as a parameter in place of, or in addition to, an acceleration rate of the vehicle 100.

In S4, the control device 200 transmits the generated travel control signal to the vehicle 100. The control device 200 repeats the cycle of obtaining vehicle position information, deciding on a target position, generating a travel control signal, transmitting the travel control signal, and the like, in each predetermined period.

Note that in S1 to S4 in the present embodiment, specifically, a command generation process, which will be described later, is executed.

In S5, the vehicle 100 receives the travel control signal transmitted from the control device 200. In S6, the vehicle 100 controls the actuators of the vehicle 100 by using the received travel control signal, whereby the vehicle 100 is caused to travel at the acceleration rate and the steering wheel angle indicated by the travel control signal. The vehicle 100 repeats the cycle of receiving a travel control signal and controlling the actuators of the vehicle 100, in each predetermined period. According to the system 10 in the present embodiment, it is possible to cause the vehicle 100 to travel by remote control, and to move the vehicle 100 without using transport equipment such as a crane or a conveyor.

Figure 3B:
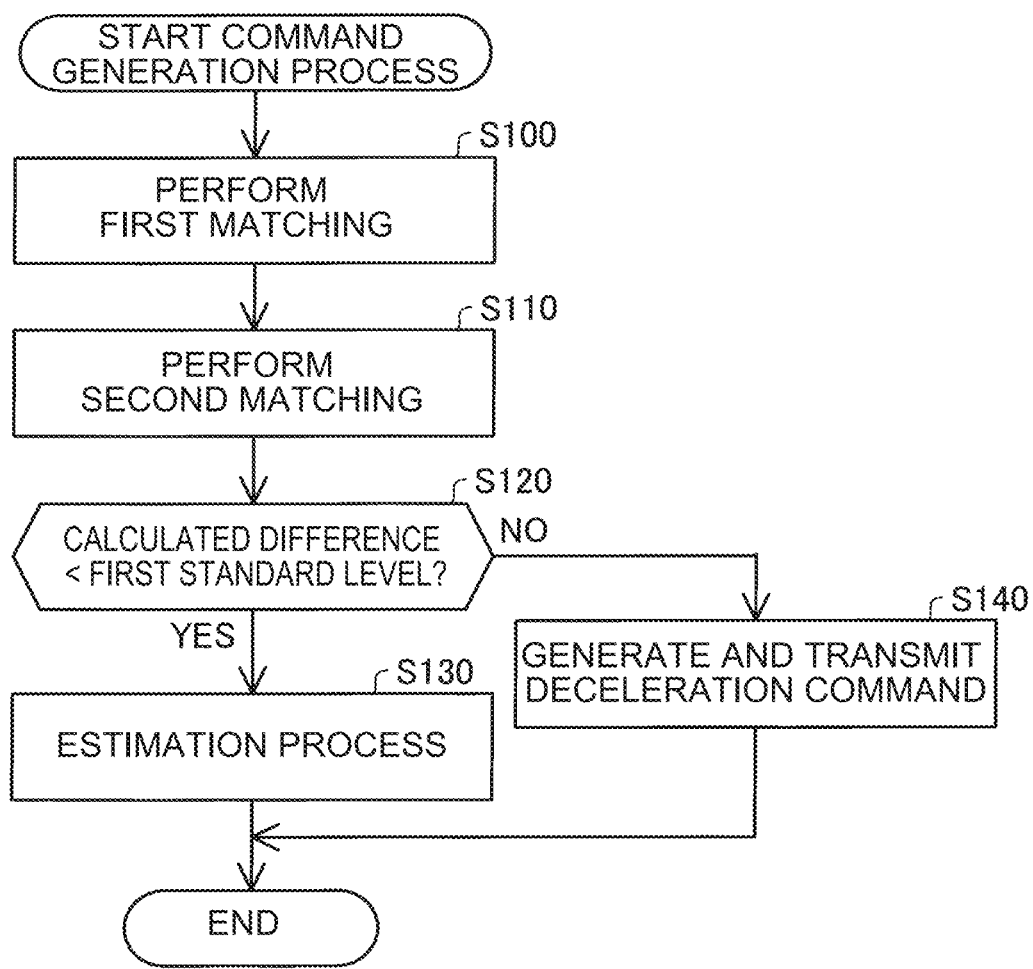
FIG. 3B is a flowchart of a command generation process in the first embodiment.

FIG. 3B is a flowchart of the command generation process for implementing an estimation method in the present embodiment. The command generation process is executed each time the three-dimensional point cloud data acquisition section 210 acquires new measured point cloud data from a distance measurement device 300 in charge of measuring the target vehicle 100. For example, prior to start of the command generation process, the three-dimensional point cloud data acquisition section 210 may execute a preprocess of removing background point cloud data representing a stationary object from the newly acquired measured point cloud data.

In S100, the first matching section 221 performs first matching. By the execution of S100, a first calculation result is calculated. In S110, the second matching section 222 performs second matching. By the execution of S110, a second calculation result is calculated.

Figure 4:
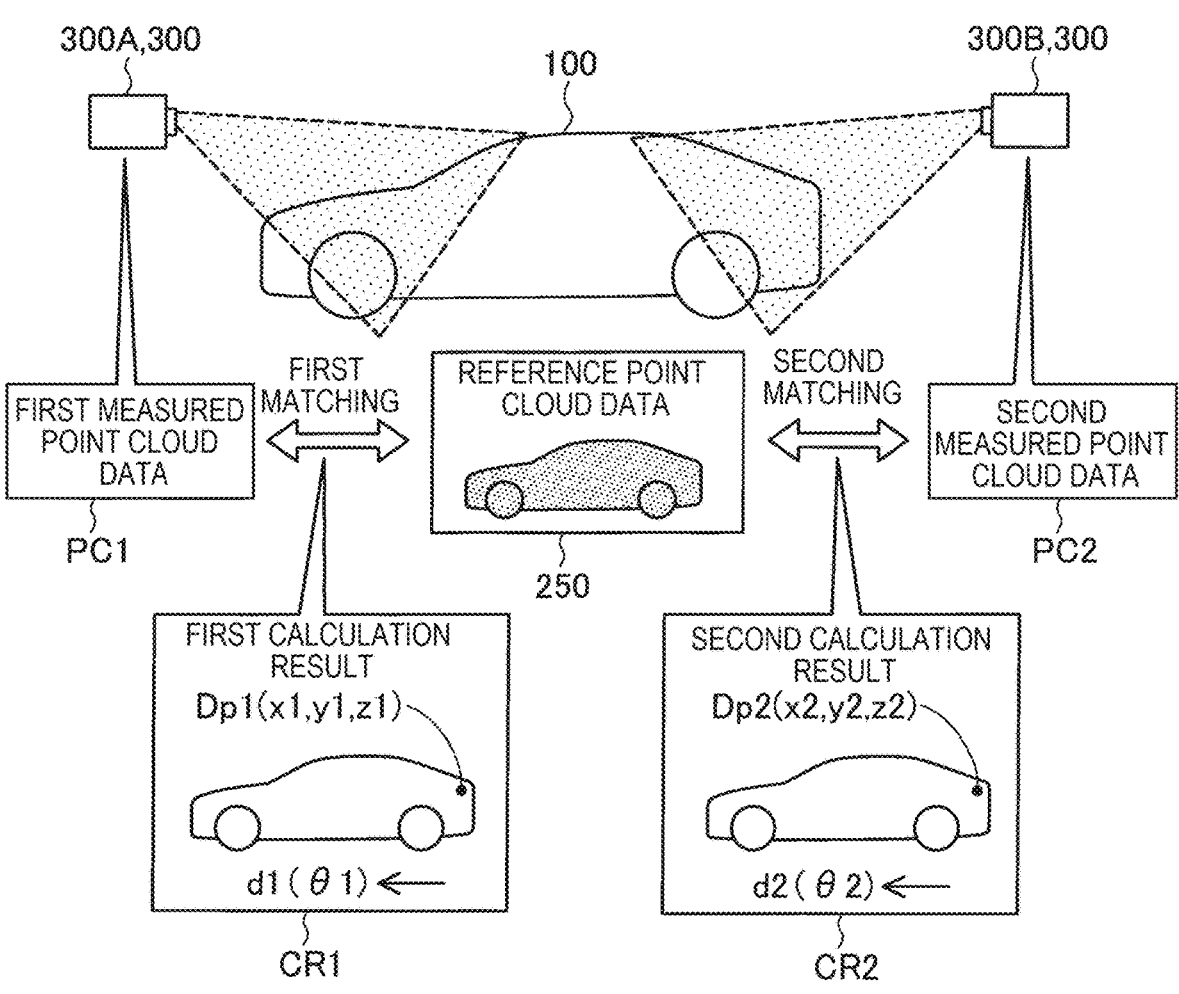
FIG. 4 is a diagram for schematically describing an example of matching.

FIG. 4 is a diagram for schematically describing an example of the matching. FIG. 4 shows a scenario in which first matching using first measured point cloud data PC1, which is acquired by a first distance measurement device 300A, and the reference point cloud data 250 is performed, and a first calculation result CR1 is thereby calculated. Moreover, FIG. 4 shows a scenario in which second matching using second measured point cloud data PC2, which is acquired by a second distance measurement device 300B, and the reference point cloud data 250 is performed, and a second calculation result CR2 is thereby calculated. The first calculation result CR1 shown in FIG. 4 includes xyz coordinates (x1, y1, z1) of a position Dp1 of the vehicle 100 and an angle θ1 representing an orientation d1 of the vehicle 100. Almost similarly, the second calculation result CR2 includes xyz coordinates (x2, y2, z2) of a position Dp2 of the vehicle 100 and an angle θ2 representing an orientation d2 of the vehicle 100. The positions Dp1, Dp2 are positions corresponding to the predetermined detection point on the vehicle 100, and each represents the same position. Each of the orientation d1 and the orientation d2 corresponds to the orientation of the vector that goes along the center axis of the vehicle 100 and goes from the rear side toward the front side of the vehicle 100. More specifically, the angle θ1 representing the orientation d1 and the angle θ2 representing the orientation d2 are calculated as angles with respect to a certain angular position as a standard, that is, 0°. The center axis of the vehicle 100 is identified, for example, by the coordinates of the center position in the vehicle-width direction on the front side of the vehicle 100 and the coordinates of the center position in the vehicle-width direction on the rear side of the vehicle 100. Since the first matching and the second matching are individually performed by using different measured point cloud data from each other, the coordinates of the position Dp1 and the coordinates of the position Dp2, in general, do not perfectly coincide. Similarly, the orientation d1 and the orientation d2, in general, do not perfectly coincide.

In S120, the estimation section 230 executes a determination process. The determination process refers to a process of determining whether or not a calculated difference representing a difference between the first calculation result CR1 and the second calculation result CR2 is less than a predetermined standard level. In the determination process, for example, when a difference between the coordinates of the position Dp1 and the coordinates of the position Dp2, that is, a distance between the two positions is less than a predetermined standard distance, the estimation section 230 determines that the calculated difference is less than the standard level. In another embodiment, in the determination process, for example, when a difference in angle between the orientation d1 and the orientation d2 is less than a predetermined standard angle, it may be determined that the calculated difference is less than the standard level. Further, for example, when the distance is less than the standard distance and the difference in angle is less than the standard angle, it may be determined that the calculated difference is less than the standard level. Hereinafter, the standard level used in the determination process is also referred to as the first standard level.

In S130, the estimation section 230 executes an estimation process when the calculated difference is less than the standard level in S120. In the estimation process in the present embodiment, the estimation section 230 calculates an estimate value by using one calculation result derived from the matching with higher reliability, of the first calculation result CR1 and the second calculation result CR2.

Thereafter, the command generation section 240 generates, by using the estimate value, and outputs a control command. Specifically, the command generation section 240 in the present embodiment generates a travel control signal as the control command, by using vehicle position information as the estimate value, and transmits the travel control signal to the vehicle 100. The vehicle control section 115 causes the vehicle 100 to travel by controlling the actuators 120 by using the received control command.

The "reliability of matching" is represented by an evaluation indicator with which reliability related to accuracy of the matching is evaluated. For the evaluation indicator with which the reliability of certain matching is evaluated, for example, a value related to the number of points in measured point cloud data used in the matching, or a degree of coincidence indicating how much measured point cloud data and the reference point cloud data 250 coincide in the matching can be used.

For the value related to the number of points, for example, a value representing the number of points or the density of points in measured point cloud data can be used. In general, the number of points or the density of points in the reference point cloud data 250 is greater than the number of points or the density of points in measured point cloud data. Accordingly, the greater the number of points or the density of points in measured point cloud data is, the smaller the difference between the number of points or the density of points in the measured point cloud data and the number of points or the density of points in the reference point cloud data 250 is, so that the more minutely the measured point cloud data and the reference point cloud data 250 can be matched against each other. Accordingly, for example, when the number of points or the density of points in the first measured point cloud data is greater than the number of points or the density of points in the second measured point cloud data, it can be determined that the reliability of the first matching is higher than the reliability of the second matching.

For the degree of coincidence, for example, an evaluation value for determining whether or not the matching has converged in each matching algorithm can be used. For example, when NDT is used for the matching algorithm, an evaluation function for determining convergence in NDT can be used for the degree of coincidence. In such a case, for example, when the value of the evaluation function at a time of completion of the convergence in the first matching is less than the value of the evaluation function at a time of completion of the convergence in the second matching, it can be determined that the reliability of the first matching is higher than the reliability of the second matching. For the degree of coincidence, apart from the foregoing, the sum, the square sum, the average, or the like of distances between corresponding points at the time of completion of the convergence can be used. In such a case, as the sum or the like of the distances between corresponding points at the time of completion of the convergence is smaller, it can be determined that the reliability is higher. Moreover, for the degree of coincidence, the number or the proportion of points that have a predetermined distance or less from the respective corresponding points in the point cloud of the reference point cloud data 250 may be used. In such a case, as the number or the proportion of points that have the predetermined distance or less from the respective corresponding points is greater, it can be determined that the reliability is higher. Note that a corresponding point that corresponds to a certain point in measured point cloud data is a point that has the least distance from the certain point, among the points in the reference point cloud data 250.

When the calculated difference is the standard level or more in S120, in S140, the command generation section 240 functioning as the deceleration command section generates a deceleration command and transmits the generated deceleration command to the target vehicle 100. In the present embodiment, the deceleration command is a travel control signal for braking the vehicle 100. Note that in the present embodiment, the estimation process is not executed when the calculated difference is the standard level or more in S120. Accordingly, when the calculated difference is the standard level or more in S120, the command generation process is terminated, without any of the calculation results being used to generate a control command.

According to the control device 200 in the present embodiment as described above, the estimation section 230 executes the estimation process of calculating an estimate value of at least one of the position and the orientation of the vehicle 100, by using at least one of the first calculation result CR1, which is derived from the first matching using three-dimensional point cloud data acquired by the first distance measurement device 300A, and the second calculation result CR2, which is derived from the second matching using three-dimensional point cloud data acquired by the second distance measurement device 300B, depending on the first calculation result CR1 and the second calculation result CR2. Accordingly, the possibility increases that accuracy in the position or orientation estimation can be enhanced, in comparison with, for example, a case where only one distance measurement device 300 is used, or a case where only single matching is performed, in the position or orientation estimation.

In the present embodiment, the estimation section 230 executes the estimation process when the calculated difference is less than the standard level, and does not execute the estimation process when the calculated difference is the standard level or more. Thus, when the calculated difference is relatively small, the estimation process using the first calculation result CR1 or the second calculation result CR2 can be executed. When the calculated difference is the standard level or more, the estimation process is not executed, and neither of the calculation results is used to generate a control command. Accordingly, it is possible to restrain accuracy in the position or orientation estimation from decreasing due to the calculated difference. Accordingly, the possibility increases that the vehicle 100 can be remotely controlled more appropriately.

In the present embodiment, in the estimation process, the estimation section 230 calculates an estimate value by using a calculation result derived from the matching with higher reliability, of the first calculation result CR1 and the second calculation result CR2. Accordingly, the possibility further increases that accuracy in the position or orientation estimation can be enhanced.

Note that in another embodiment, in the estimation process, the estimation section 230 may calculate an estimate value by using, for example, an average of the first calculation result CR1 and the second calculation result CR2, irrespective of the reliability of matching. Thus, the position or the orientation can be easily estimated by using the first calculation result CR1 and the second calculation result CR2. In the present embodiment, since the estimation process is executed when the calculated difference is less than the standard level as described above, it is possible to restrain accuracy in the position or orientation estimation from decreasing even if the average of each calculation result is used in the estimation process, irrespective of the reliability of matching. Moreover, by estimating the position or the orientation by using the average of each calculation result, it is possible to restrain an individual difference of each distance measurement device 300 from affecting a result of the position or orientation estimation.

In the present embodiment, when the calculated difference is the first standard level or more, the deceleration command section generates a deceleration command to cause the vehicle 100 to decelerate or stop. Accordingly, when accuracy in the position or orientation estimation can decrease due to the calculated difference, it is possible to cause the target vehicle 100 to decelerate or stop by using the deceleration command. Accordingly, the vehicle 100 can be remotely controlled more appropriately.

Note that in another embodiment, the deceleration command section may generate a deceleration command to cause the vehicle 100 to stop, for example, when the calculated difference is equal to or more than a second standard level that is more than the first standard level, and may generate a deceleration command to cause the vehicle 100 to decelerate when the calculated difference is equal to or more than the first standard level and is less than the second standard level.

B. Second Embodiment

Figure 5:
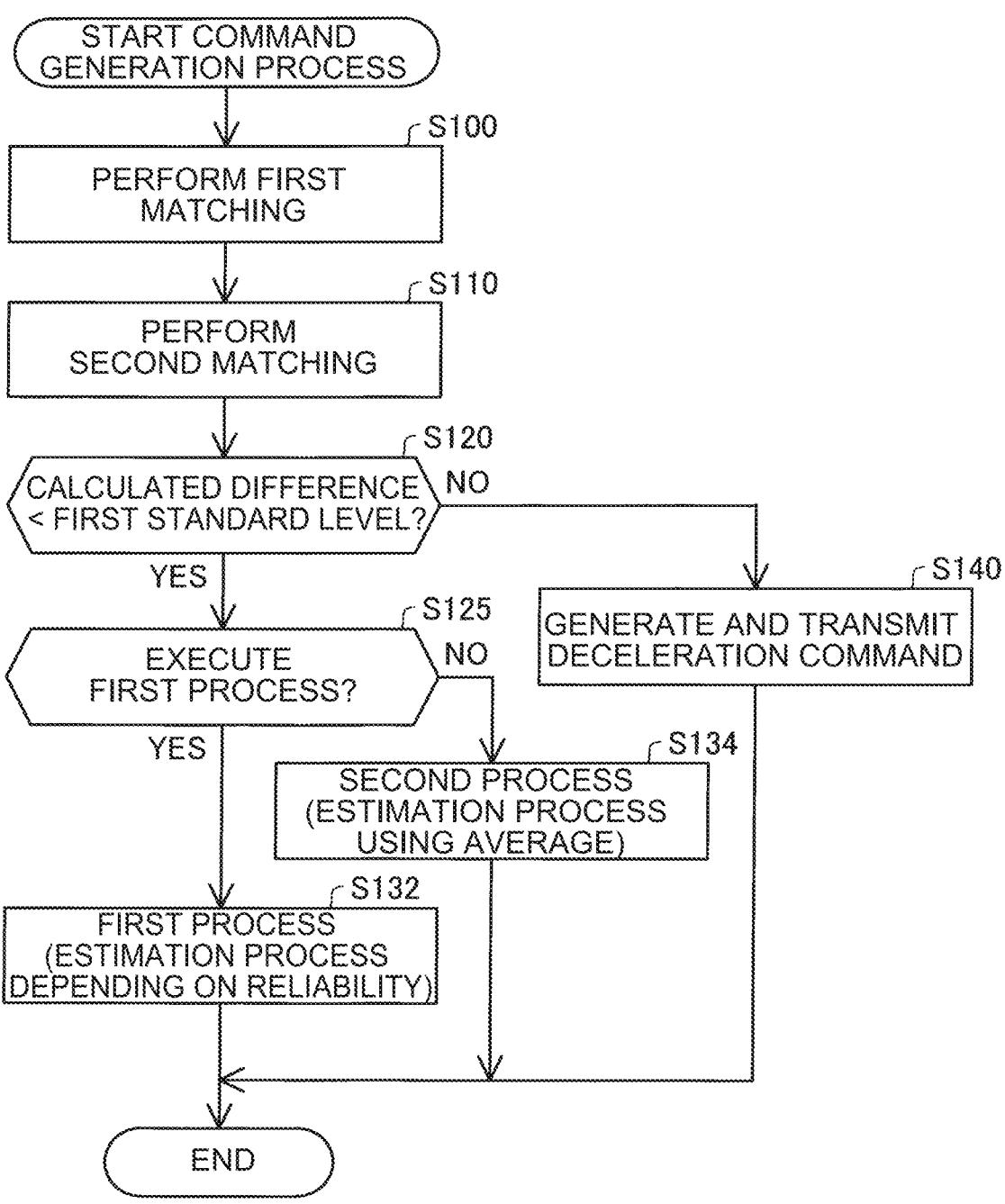
FIG. 5 is a flowchart of a command generation process in a second embodiment.

FIG. 5 is a flowchart of a command generation process for implementing an estimation method in a second embodiment. In FIG. 5, steps similar to those in FIG. 3B are denoted by the same signs in FIG. 3B. In the second embodiment, unlike the first embodiment, a decision process is executed in the command generation process. The decision process is a process of selectively deciding whether to execute a first process of calculating an estimate value depending on the reliability of matching, or to execute a second process of calculating an estimate value by using the average of each calculation result. The first process is, for example, a process of calculating an estimate value by using a calculation result derived from matching with higher reliability, as described in the first embodiment. In configurations of the control device 200 and the system 10 in the second embodiment, parts that are not particularly described are similar to those in the first embodiment.

In the present embodiment, when the calculated difference is less than the standard level in S120 in FIG. 5, in S125, the estimation section 230 executes the decision process.

For a decision criterion in the decision process, for example, a difference related to the number of points, a difference related to a separate distance between a distance measurement device 300 and the vehicle 100, or a difference related to the angular position of the vehicle 100 with respect to a distance measurement device 300 can be used. The separate distance and the angular position affect the accuracy and the reliability of matching, similarly to the number of points and the density of points described in the first embodiment. For example, in general, the number of points or the density of points in measured point cloud data related to a vehicle 100 increases as the separate distance related to the vehicle 100 becomes shorter, and decreases as the separate distance related to the vehicle 100 becomes longer. The angular position of a vehicle 100 affects whether or not a distance measurement device 300 in charge of measuring the vehicle 100 can acquire three-dimensional point cloud data on a portion with more features of the vehicle 100. In measured point cloud data, part corresponding to such a portion with more features includes a greater number of points or a greater density of points. Accordingly, since the first process is executed when any of the above-mentioned differences is relatively large, and a calculation result derived from matching with higher reliability thus can be used in the calculation of an estimate value, it is possible to restrain accuracy in the position or orientation estimation from decreasing due to such a difference. Moreover, since the second process is executed when the difference is relatively small, and the average of each calculation result thus can be used in the calculation of an estimate value, it is possible to restrain an individual difference of each distance measurement device 300 from affecting a result of the position or orientation estimation.

More specifically, when the difference related to the number of points is used for the decision criterion, it may be decided to execute the first process, for example, when the difference in number of points or density of points between the first measured point cloud data and the second measured point cloud data is larger than a predetermined level. In such a case, it may be decided to execute the first process when a difference between variation of the number of points or the density of points in the first measured point cloud data and variation of the number of points or the density of points in the second measured point cloud data is larger than a predetermined level. The variation of the number of points or the density of points in measured point cloud data can be evaluated as the size of a difference in number of points or density of points between each voxel when the measured point cloud data is divided into a plurality of voxels. When the difference related to the separate distance is used for the decision criterion, it may be decided to execute the first process when a difference between the separate distance between the first distance measurement device and the vehicle 100 and the separate distance between the second distance measurement device and the vehicle 100 is greater than a predetermined level. When the difference related to the angular position is used for the decision criterion, it may be decided to execute the first process when a difference between the angular position of the vehicle 100 with respect to the first distance measurement device and the angular position of the vehicle 100 with respect to the second distance measurement device is greater than a predetermined level. Note that when the difference related to the separate distance or the difference related to the angular position is applied as the decision criterion, it can be decided which one of the first process and the second process is executed, for example, by using a result of measurement by a distance measurement device 300 of the distance of the vehicle 100, without analyzing the measured point cloud data.

The estimation section 230 executes the first process in S132 when it is decided to execute the first process in S125, and executes the second process in S134 when it is decided to execute the second process in S125.

According to the second embodiment described above, by executing the decision process, it can be decided whether to execute the first process of calculating an estimate value depending on the reliability of matching, or to execute the second process of calculating an estimate value by using the average of each calculation result. By executing the estimation process according to a result of the decision process, the position or the orientation of the vehicle 100 can be estimated more effectively.

C. Third Embodiment

Figure 6:
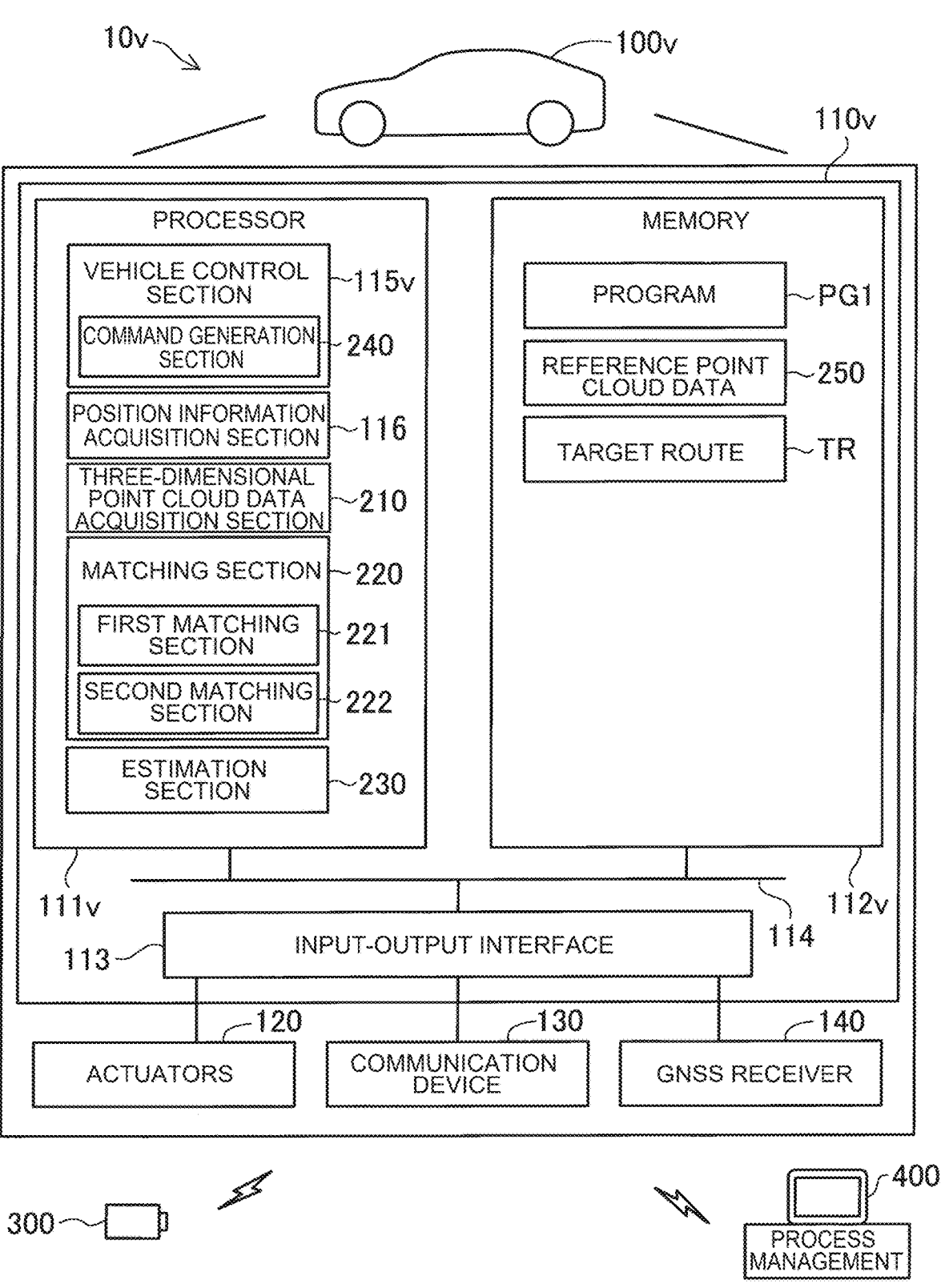
FIG. 6 is a conceptual diagram showing a configuration of a system in a third embodiment.

FIG. 6 is a conceptual diagram showing a configuration of a system 10v in a third embodiment. Unlike the first embodiment, the system 10v in the present embodiment does not include the control device 200. Moreover, a vehicle 100v in the present embodiment can travel by autonomous control of the vehicle 100v. In configurations of the system 10v and the vehicle 100v in the third embodiment, parts that are not particularly described are similar to those in the first embodiment.

In the present embodiment, a communication device 130 of the vehicle 100v can communicate with the distance measurement devices 300 and the process management device 400. A processor 111v of a vehicle control device 110v functions as a vehicle control section 115v, a position information acquisition section 116, a three-dimensional point cloud data acquisition section 210, a matching section 220, an estimation section 230, and a command generation section 240 by executing a program PG1 stored in a memory 112v. The vehicle control section 115v can cause the vehicle 100v to travel by autonomous control, by acquiring a result of detection by a sensor, generating a travel control signal by using the result of detection, and causing the actuators 120 to operate by outputting the generated travel control signal. Moreover, in the present embodiment, the vehicle control section 115v functions as the command generation section 240. In addition to the program PG1, reference point cloud data 250 and a target route TR are stored in the memory 112v. The vehicle control device 110v in the third embodiment corresponds to "estimation device" in the present disclosure.

Figure 7:
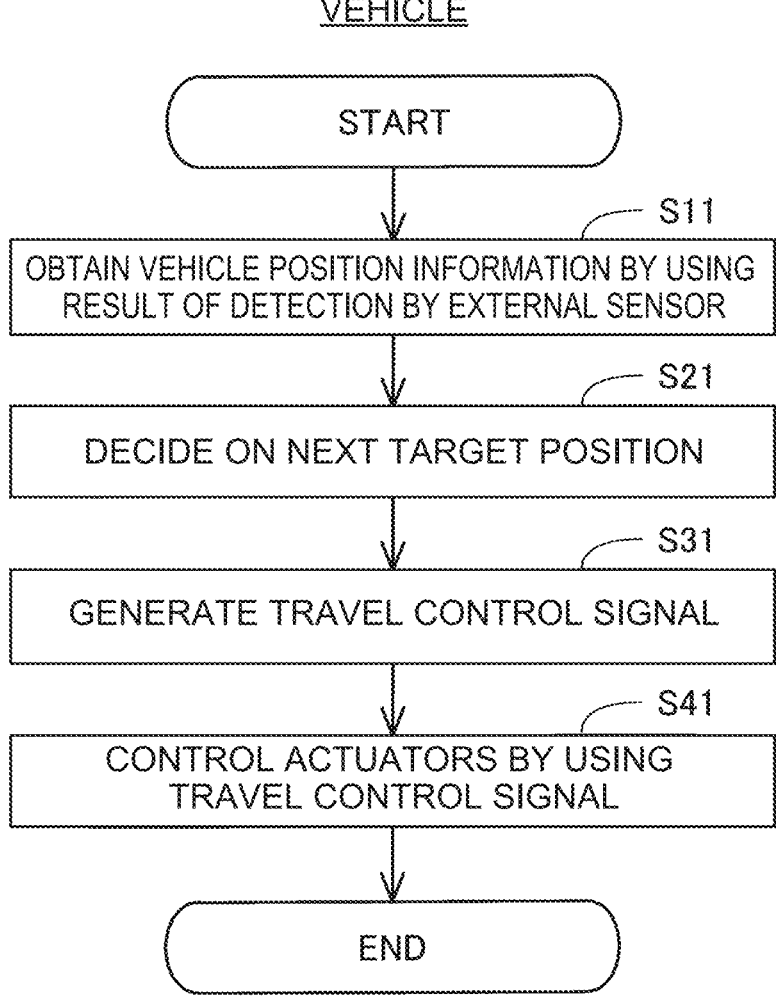
FIG. 7 is a flowchart showing a processing procedure for vehicle travel control in the third embodiment.

FIG. 7 is a flowchart showing a processing procedure for travel control of the vehicle 100v in the third embodiment. In S11, the vehicle 100v obtains vehicle position information by using a result of detection output from a distance measurement device 300 that is an external sensor. In S21, the vehicle 100v decides on a target position for the vehicle 100v to head for next. In S31, the vehicle 100v generates a travel control signal for causing the vehicle 100v to travel toward the decided target position. In S41, the vehicle 100v controls the actuators of the vehicle 100v by using the generated travel control signal, whereby the vehicle 100v is caused to travel according to parameters indicated by the travel control signal. The vehicle 100v repeats the cycle of obtaining vehicle position information, deciding on a target position, generating a travel control signal, and controlling the actuators, in each predetermined period. According to the system 10v in the present embodiment, it is possible to cause the vehicle 100v to travel by autonomous control of the vehicle 100v, without remote control of the vehicle 100v being performed by the control device 200.

In S11 to S41 in the present embodiment, a command generation process similar to that in FIG. 3B is executed. The command generation process is executed each time the three-dimensional point cloud data acquisition section 210 of the vehicle 100v acquires new measured point cloud data from a distance measurement device 300 in charge of measuring the target vehicle 100v. Note that in the present embodiment, the target vehicle 100v refers to an own vehicle.

In the present embodiment, each step in FIG. 3B is executed by the processor 111v of the vehicle 100v. For example, when an estimate value is calculated in S130, the command generation section 240 included in the vehicle 100v generates, by using the estimate value, and outputs a control command. Specifically, the command generation section 240 in the present embodiment generates a travel control signal by using vehicle position information as the estimate value, and outputs the travel control signal. The vehicle control section 115v causes the vehicle 100v to travel by controlling the actuators 120 by using the travel control signal. In S140, the command generation section 240 of the vehicle 100v generates and outputs a deceleration command by functioning as a deceleration command section. The vehicle control section 115v causes the vehicle 100v to decelerate or stop by controlling the actuators 120 according to the deceleration command.

Also with the vehicle control device 110v in the present embodiment, the possibility increases that accuracy in the position or orientation estimation can be enhanced, in comparison with, for example, a case where only one distance measurement device 300 is used, or a case where only single matching is performed, in the position or orientation estimation.

Note that in another embodiment in which the vehicle 100v travels by autonomous control as in the present embodiment, for example, the command generation process in FIG. 5 described in the second embodiment may be executed. In another embodiment in which the vehicle 100v travels by autonomous control, for example, the control device 200 may be included in the system 10v.

D. Other Embodiments (D1) Although the estimation section 230 executes the determination process in the embodiments, the determination process does not need to be executed. In other words, although the estimation section 230 executes the estimation process when the calculated difference is less than the standard level in the embodiments, the estimation section 230 does not need to be configured in such a manner. For example, the estimation section 230 may calculate an estimate value by using a calculation result with higher reliability, of the first calculation result CR1 and the second calculation result CR2, without executing the determination process. Also in such a case, since an estimate value of position or orientation can be calculated by using at least one of the calculation results, depending on each calculation result, the possibility increases that accuracy in the position or orientation estimation can be enhanced.

(D2) In each of the embodiments, a vehicle 100 only needs to include components that are movable by driverless driving, and, for example, may be in the form of a platform including components as described below. Specifically, a vehicle 100 may include at least the control device that controls travel of the vehicle 100 and the actuators of the vehicle 100v, in order to fulfill three functions of "traveling", "turning", and "stopping" by driverless driving. When the vehicle 100 externally acquires information for driverless driving, the vehicle 100 may further include the communication device. In other words, the vehicle 100 that is movable by driverless driving may be unequipped with at least one or some of interior parts such as a driving seat and a dashboard, may be unequipped with at least one or some of exterior parts such as a bumper and a fender, and may be unequipped with a bodyshell. In such a case, the remaining parts, such as the bodyshell, may be attached to the vehicle 100 by a time when the vehicle 100 is shipped from the factory, or the remaining parts, such as the bodyshell, may be attached to the vehicle 100 after the vehicle 100 in a state of being unequipped with the remaining parts, such as the bodyshell, is shipped from the factory. Each part may be attached in an arbitrary direction, such as from an upper side, a lower side, a front side, a rear side, a right side, or a left side of the vehicle 100, may be attached in the same direction, or may be attached in different directions from each other. Note that in the form of a platform, position decision can also be performed similarly to the vehicle 100 in the first embodiment.

(D3) In each of the embodiments, various functional sections, such as the three-dimensional point cloud data acquisition section 210, the matching section 220, the estimation section 230, and the command generation section 240, may be included in the vehicle 100 in the system 10. In such a case, as described in the third embodiment, all of the three-dimensional point cloud data acquisition section 210, the matching section 220, the estimation section 230, and the command generation section 240 may be included in the vehicle 100, or one or some of the functional sections may be included in the vehicle 100. In the system 10, one or some, or all, of the functional sections may be included in an external device outside of the control device 200 and the vehicle 100.

(D4) In the first embodiment, the processes from obtainment of vehicle position information up to generation of a travel control signal are executed by the control device 200. In contrast, at least one or some of the processes from obtainment of vehicle position information up to generation of a travel control signal may be executed by the vehicle 100. For example, embodiments as described in (1) to (3) below may be possible.

(1) The control device 200 may obtain vehicle position information, may decide on a target position for the vehicle 100 to head for next, and may generate a path from the current position of the vehicle 100 indicated in the obtained vehicle position information up to the target position. The control device 200 may generate a path up to the target position between the current position and a destination, or may generate a path up to the destination. The control device 200 may transmit the generated path to the vehicle 100. The vehicle 100 may generate a travel control signal such that the vehicle 100 travels on the path received from the control device 200, and may control the actuators of the vehicle 100v by using the generated travel control signal.

(2) The control device 200 may obtain vehicle position information, and may transmit the obtained vehicle position information to the vehicle 100. The vehicle 100 may decide on a target position for the vehicle 100 to head for next, may generate a path from the current position of the vehicle 100 indicated in the received vehicle position information up to the target position, may generate a travel control signal such that the vehicle 100 travels on the generated path, and may control the actuators of the vehicle 100v by using the generated travel control signal.

(3) In the embodiments described in (1), (2), an internal sensor may be mounted in the vehicle 100, and a result of detection output from the internal sensor may be used in at least one of the generation of a path and the generation of a travel control signal. The internal sensor is a sensor mounted in the vehicle 100. Specifically, examples of the internal sensor can include a camera, a LiDAR, a millimeter-wave radar, an ultrasound sensor, a GPS sensor, an accelerometer, a gyroscope sensor, and the like. For example, in the embodiment described in (1), the control device 200 may acquire a result of detection by the internal sensor and, when generating a path, may reflect the result of detection by the internal sensor in the path. In the embodiment described in (1), the vehicle 100 may acquire a result of detection by the internal sensor and, when generating a travel control signal, may reflect the result of detection by the internal sensor in the travel control signal. In the embodiment described in (2), the vehicle 100 may acquire a result of detection by the internal sensor and, when generating a path, may reflect the result of detection by the internal sensor in the path. In the embodiment described in (2), the vehicle 100 may acquire a result of detection by the internal sensor and, when generating a travel control signal, may reflect the result of detection by the internal sensor in the travel control signal.

(D5) In the third embodiment, an internal sensor may be mounted in the vehicle 100v, and a result of detection output from the internal sensor may be used in at least one of the generation of a path and the generation of a travel control signal. For example, the vehicle 100v may acquire a result of detection by the internal sensor and, when generating a path, may reflect the result of detection by the internal sensor in the path. The vehicle 100v may acquire a result of detection by the internal sensor and, when generating a travel control signal, may reflect the result of detection by the internal sensor in the travel control signal.

(D6) In the first embodiment, the control device 200 automatically generates a travel control signal to transmit to the vehicle 100. In contrast, the control device 200 may generate a travel control signal to transmit to the vehicle 100, according to an operation by an external operator located outside of the vehicle 100. For example, the external operator may operate a maneuvering device that includes a display for displaying a captured image output from each external sensor, a steering wheel, an accelerator, and a brake pedal for remotely controlling the vehicle 100, and a communication device for communicating with the control device 200 through wired communication or wireless communication, and the control device 200 may generate a travel control signal according to an operation applied to the maneuvering device. Hereinafter, driving of the vehicle 100 through such control is also referred to as "remote manual driving". In an embodiment in which remote manual driving is performed, for example, a result of estimation of the position or the orientation of the vehicle 100 estimated by the estimation section 230 may be displayed on the display included in the maneuvering device. In such a case, on the display, the result of the position or orientation estimation may be displayed by using, for example, letters, characters, or symbols, or may be displayed on a map.

(D7) The vehicle 100 may be manufactured by combining a plurality of modules. A module refers to a unit including a plurality of parts that is assembled according to each portion or each function of the vehicle 100. For example, a platform of the vehicle 100 may be manufactured by combining a front module that constitutes a front portion of the platform, a center module that constitutes a central portion of the platform, and a rear module that constitutes a rear portion of the platform. Note that the number of modules included in the platform is not limited to three, and may be two or less, or four or more. Moreover, in addition to, or in place of, the parts included in the platform, parts included a different portion of the vehicle 100 from the platform may be modularized. Various modules may include arbitrary exterior parts, such as a bumper and a grille, and arbitrary interior parts, such as a seat and a console. Not only the vehicle 100, a mobile object in an arbitrary aspect may be manufactured by combining a plurality of modules. For example, such a module may be manufactured by joining a plurality of parts by welding, with fixing devices, or the like, or may be manufactured by forming at least some of the parts included in the module into one unified part by casting. A casting scheme of forming one unified part, particularly a relatively large part, is also referred to as giga casting or mega casting. For example, the front module, the center module, and the rear module may be manufactured by using giga casting.

(D8) Transporting the vehicle 100 by utilizing travel of the vehicle 100 by driverless driving is also referred to as "self-propelled transport". A configuration for implementing the self-propelled transport is also referred to as "vehicle remote control self-driving transport system". Moreover, a production method of producing the vehicle 100 by utilizing the self-propelled transport is also referred to as "self-propelled production". In the self-propelled production, for example, in a factory where the vehicle 100 is manufactured, at least part of transport of the vehicle 100 is implemented by the self-propelled transport.

(D9) In each of the embodiments, one or some, or all, of the functions and the processes implemented by using software may be implemented by using hardware. One or some, or all, of the functions and the processes implemented by using hardware may be implemented by using software. For the hardware for implementing the various functions in each of the embodiments, for example, various circuits, such as an integrated circuit and a discrete circuit, may be used.

The present disclosure is not limited to the embodiments described above, and can be implemented in various configurations without departing from the gist thereof. For example, technical features in the embodiments that correspond to the technical features in the individual embodiments described in SUMMARY can be replaced or combined as appropriate, in order to solve one or some, or all, of the problems, or to achieve one or some, or all, of the effects. A technical feature can be excluded as appropriate unless the technical feature is described as essential in the present description.

What is claimed is:

1. An estimation device used to cause a mobile object to move by driverless driving, the estimation device comprising one or more processors configured to:

perform first matching using three-dimensional point cloud data on the mobile object acquired by a first distance measurement device, and calculate at least one of a position and an orientation of the mobile object as a first calculation result derived from the first matching;

perform second matching using three-dimensional point cloud data on the mobile object acquired by a second distance measurement device, and calculate at least one of a position and an orientation of the mobile object as a second calculation result derived from the second matching;

calculate an estimate value that is an estimate value of at least one of the position and the orientation of the mobile object and that is used to generate a control command for the driverless driving;

execute an estimation process of calculating the estimate value by using at least one of the first calculation result and the second calculation result, when a difference between the first calculation result and the second calculation result is less than a predetermined standard level; and generate a deceleration command to cause the mobile object to decelerate or stop, when the difference between the first calculation result and the second calculation result is the predetermined standard level or more.

2. The estimation device according to claim 1, wherein in the estimation process, the one or more processors calculate the estimate value by using one calculation result derived from the matching with higher reliability, of the first calculation result and the second calculation result.

3. The estimation device according to claim 1, wherein in the estimation process, the one or more processors calculate the estimate value by using an average of the first calculation result and the second calculation result.

4. An estimation method comprising:

performing first matching using three-dimensional point cloud data on a mobile object acquired by a first distance measurement device, and calculating at least one of a position and an orientation of the mobile object as a first calculation result derived from the first matching;

performing second matching using three-dimensional point cloud data on the mobile object acquired by a second distance measurement device, and calculating at least one of a position and an orientation of the mobile object as a second calculation result derived from the second matching;

calculating an estimate value that is an estimate value of at least one of the position and the orientation of the mobile object and that is used to generate a control command for driverless driving;

executing an estimation process of calculating the estimate value by using at least one of the first calculation result and the second calculation result, when a difference between the first calculation result and the second calculation result is less than a predetermined standard level; and generating a deceleration command to cause the mobile object to decelerate or stop, when the difference between the first calculation result and the second calculation result is the predetermined standard level or more.

5. A non-transitory storage medium storing instructions that are executable by one or more processors and that cause the one or more processors to perform functions comprising:

performing first matching using three-dimensional point cloud data on a mobile object acquired by a first distance measurement device, and calculating at least one of a position and an orientation of the mobile object as a first calculation result derived from the first matching;

performing second matching using three-dimensional point cloud data on the mobile object acquired by a second distance measurement device, and calculating at least one of a position and an orientation of the mobile object as a second calculation result derived from the second matching;

calculating an estimate value that is an estimate value of at least one of the position and the orientation of the mobile object and that is used to generate a control command for driverless driving;

executing an estimation process of calculating the estimate value by using at least one of the first calculation result and the second calculation result, when a difference between the first calculation result and the second calculation result is less than a predetermined standard level; and generating a deceleration command to cause the mobile object to decelerate or stop, when the difference between the first calculation result and the second calculation result is the predetermined standard level or more.

* * * * *